(12) United States Patent
Galasso et al.

(10) Patent No.: US 11,566,682 B2
(45) Date of Patent: Jan. 31, 2023

(54) METHODS AND APPARATUS FOR LUBRICATING SUSPENSION COMPONENTS

(71) Applicant: Fox Factory, Inc., Duluth, GA (US)

(72) Inventors: Mario Galasso, Sandy Hook, CT (US); David Haugen, Pacific Grove, CA (US)

(73) Assignee: Fox Factory, Inc., Duluth, GA (US)

( * ) Notice: Subject to any disclaimer, the term of this patent is extended or adjusted under 35 U.S.C. 154(b) by 93 days.

(21) Appl. No.: 16/903,151

(22) Filed: Jun. 16, 2020

(65) Prior Publication Data

US 2020/0309231 A1 Oct. 1, 2020

Related U.S. Application Data

(60) Continuation of application No. 15/442,532, filed on Feb. 24, 2017, now Pat. No. 10,697,515, which is a continuation of application No. 14/292,263, filed on May 30, 2014, now Pat. No. 9,599,182, which is a division of application No. 14/166,754, filed on Jan. 28, 2014, now abandoned, which is a continuation of application No. 12/554,756, filed on Sep. 4, 2009, now Pat. No. 8,672,096.

(60) Provisional application No. 61/094,324, filed on Sep. 4, 2008.

(51) Int. Cl.
| | |
|---|---|
| *B62K 25/08* | (2006.01) |
| *F16F 13/00* | (2006.01) |
| *F16F 9/32* | (2006.01) |
| *F16N 13/00* | (2006.01) |
| *F16F 9/18* | (2006.01) |

(52) U.S. Cl.
CPC ............ *F16F 13/007* (2013.01); *B62K 25/08* (2013.01); *F16F 9/185* (2013.01); *F16F 9/3278* (2013.01); *F16N 13/00* (2013.01); *F16F 2230/04* (2013.01)

(58) Field of Classification Search
CPC ........ F16F 9/26; F16F 9/36; F16F 9/44; F16F 9/46; F16F 9/185; F16F 9/3278; B62K 25/08
USPC ....... 188/315, 318, 322.16, 322.17; 280/276, 280/284
See application file for complete search history.

(56) References Cited

U.S. PATENT DOCUMENTS

| | | | | |
|---|---|---|---|---|
| 1,078,060 | A | * | 11/1913 | Newman ................ F16F 9/26 188/318 |
| 1,560,477 | A | * | 11/1925 | Kessler ................. F16F 9/44 188/129 |
| 2,363,867 | A | | 11/1944 | Isely |
| 4,070,134 | A | | 1/1978 | Gramling |
| 4,280,600 | A | | 7/1981 | Salmon et al. |
| 4,528,896 | A | | 7/1985 | Edwards |
| 4,572,488 | A | | 2/1986 | Holmberg et al. |
| 4,787,642 | A | | 11/1988 | Etheridge et al. |
| 4,952,075 | A | | 8/1990 | Rogers, III |
| 5,246,236 | A | | 9/1993 | Szarka et al. |
| 5,622,434 | A | | 4/1997 | Takahashi |
| 5,934,422 | A | | 8/1999 | Steed |
| 5,934,697 | A | | 8/1999 | McAndrews |
| 6,415,895 | B2 | | 7/2002 | Marking et al. |
| 6,592,136 | B2 | | 7/2003 | Becker et al. |

(Continued)

OTHER PUBLICATIONS

"The Lee Company Technical Hydraulic Handbook", 1996, 1-696.

*Primary Examiner* — Christopher P Schwartz

(57) ABSTRACT

Methods and apparatus for lubricating suspension seals by pumping fluid to the seals using a compression or rebound action of a suspension component.

12 Claims, 6 Drawing Sheets

(56) References Cited

U.S. PATENT DOCUMENTS

| | | |
|---|---|---|
| 6,619,844 B1 | 9/2003 | Baalmann et al. |
| 6,966,412 B2 | 11/2005 | Braswell et al. |
| 7,163,222 B2 * | 1/2007 | Becker .................... F16F 9/064 280/276 |
| 7,290,643 B2 | 11/2007 | Fujita et al. |
| 7,374,028 B2 | 5/2008 | Fox |
| 7,708,296 B2 | 5/2010 | Becker et al. |
| 7,722,069 B2 | 5/2010 | Shirai |
| 8,033,368 B2 | 10/2011 | Becker et al. |
| 8,196,723 B1 | 6/2012 | Shore et al. |
| 10,697,515 B2 * | 6/2020 | Galasso .................. F16F 9/185 |
| 2005/0087953 A1 | 4/2005 | Becker et al. |
| 2017/0167563 A1 | 6/2017 | Galasso et al. |

* cited by examiner

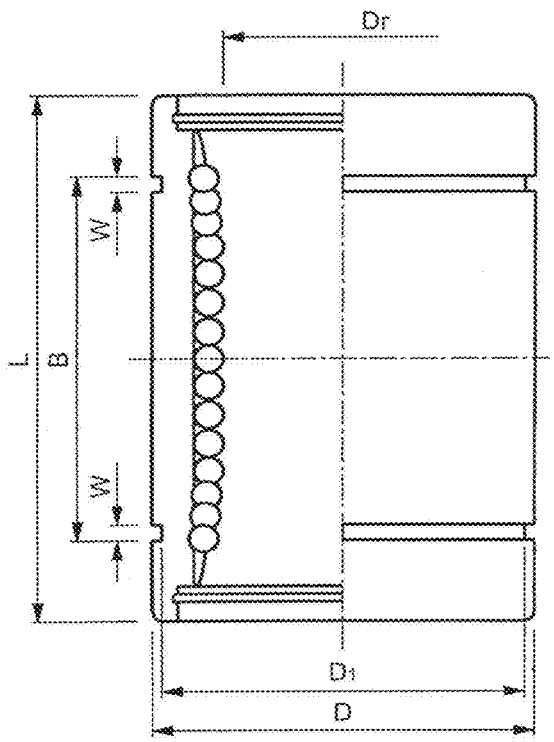
*FIG. 6B*
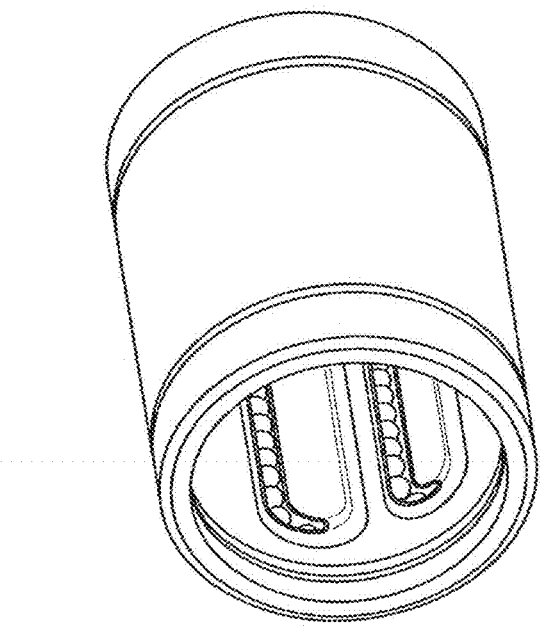
*FIG. 6A*
| | | | |
|---|---|---|---|
| dr (mm) | | | 50.800 |
| mass g | | | 1,310 |
| basic load rating | static Co N | | 7,940 |
| | dynamic C N | | 3,820 |
| radial clearance | | | -.0005 -13 |
| eccentricity | high inch/μm | | .0010 35 |
| | precision inch/μm | | .0007 17 |
| D1 | | | 2.8379 |
| W inch | | | .1029 |
| B | tolerance inch/μm | | 0 -.012 |
| | inch | | 3.1917 |
| L | tolerance inch/μm | | 0 -.012 |
| | inch | | 4.0000 |
| D | tolerance inch/μm | | 0 -.00090 |
| | inch | | 3.000 |
| dr | tolerance inch/μm | high | 0 -.00050 |
| | | precision | 0 -.00035 |
| | inch | | 2.0000 |
| Number of ball circuits | | | 6 |
| Item Number | | | SW32 |
*FIG. 6C*

11,566,682 B2

METHODS AND APPARATUS FOR LUBRICATING SUSPENSION COMPONENTS

CROSS-REFERENCE TO RELATED APPLICATIONS

This patent application is a Continuation of and claims the benefit of co-pending U.S. patent application Ser. No. 15/442,532, filed on Feb. 24, 2017, entitled "METHODS AND APPARATUS FOR LUBRICATING SUSPENSION COMPONENTS", by Galasso et al., assigned to the assignee of the present application, which is incorporated in its entirety herein by reference thereto.

The patent application having Ser. No. 15/442,532 is a Continuation of and claims the benefit of U.S. patent application Ser. No. 14/292,263, filed on May 30, 2014, now U.S. Issued U.S. Pat. No. 9,599,182, entitled "METHODS AND APPARATUS FOR LUBRICATING SUSPENSION COMPONENTS", by Galasso et al., assigned to the assignee of the present application, which is incorporated in its entirety herein by reference thereto.

The patent application having Ser. No. 14/292,263 is a divisional of and claims the benefit of U.S. patent application Ser. No. 14/166,754, filed on Jan. 28, 2014, now abandoned, entitled "METHODS AND APPARATUS FOR LUBRICATING SUSPENSION COMPONENTS", by Galasso et al., assigned to the assignee of the present application, which is incorporated in its entirety herein by reference thereto.

The patent application having Ser. No. 14/166,754 is a continuation of and claims the benefit of U.S. patent application Ser. No. 12/554,756, filed on Sep. 4, 2009, entitled "METHODS AND APPARATUS FOR LUBRICATING SUSPENSION COMPONENTS", by Galasso et al., now U.S. Issued U.S. Pat. No. 8,672,096, assigned to the assignee of the present application, which is incorporated herein in its entirety by reference thereto.

The U.S. patent application Ser. No. 12/554,756 claims priority to and benefit of U.S. provisional patent application 61/094,324, filed Sep. 4, 2008, entitled "METHODS AND APPARATUS FOR LUBRICATING SUSPENSION COMPONENTS", by Galasso et al., assigned to the assignee of the present application, which is incorporated herein in its entirety by reference thereto.

FIELD OF THE INVENTION

Embodiments of the invention generally relate to methods and apparatus for use in suspension assemblies. Particular embodiments of the invention relate to methods and apparatus useful for lubricating components of telescopic vehicle suspension.

BACKGROUND

Vehicles, including wheeled vehicles, are typically suspended to absorb shock encountered while traversing uneven terrain. Fundamental vehicle suspensions for controlling vehicle body motion and handling characteristics during vehicle travel over uneven surface are well-known in the art. Wheeled vehicles usually include one vehicle suspension assembly per wheel so that each wheel may absorb shock independently. Vehicle suspensions typically comprise many components, including a hydraulic cylinder with an internal piston connected to a central piston rod, which reciprocates within the cylinder to produce damping forces.

Damping forces created by the vehicle suspension have a major influence on the overall dynamic performance of a vehicle. A wide range of dynamic conditions are encountered during typical vehicle motion over various surface and terrain features. For example, these features and conditions include large and small bumps, sharp-edged bumps and round-edged bumps, close-spaced bumps and wide spaced bumps, stutter bumps and gradual undulating bumps, and so forth. Thus, the vehicle suspension undergoes a wide range of tough conditions that puts pressure on the functionality of its internal components. What is needed are vehicle suspension assemblies that better accommodate these performance requirements, as there exists many limitations to the present state of vehicle suspension technology.

BRIEF DESCRIPTION OF THE DRAWINGS

The accompanying drawings, which are incorporated in and form a part of this specification, illustrate embodiments of the present technology for lubricating suspension components, together with the description, serve to explain principles discussed below:

FIG. 6A is a ball bearing bushing embodiment as disclosed herein.

FIG. 6B shows the dimensions for the ball bearing bushing embodiment of FIG. 6A as disclosed herein.

FIG. 6C shows the specification for the ball bearing bushing embodiment of FIG. 6A as disclosed herein.

DESCRIPTION OF EMBODIMENTS

Figure 1:
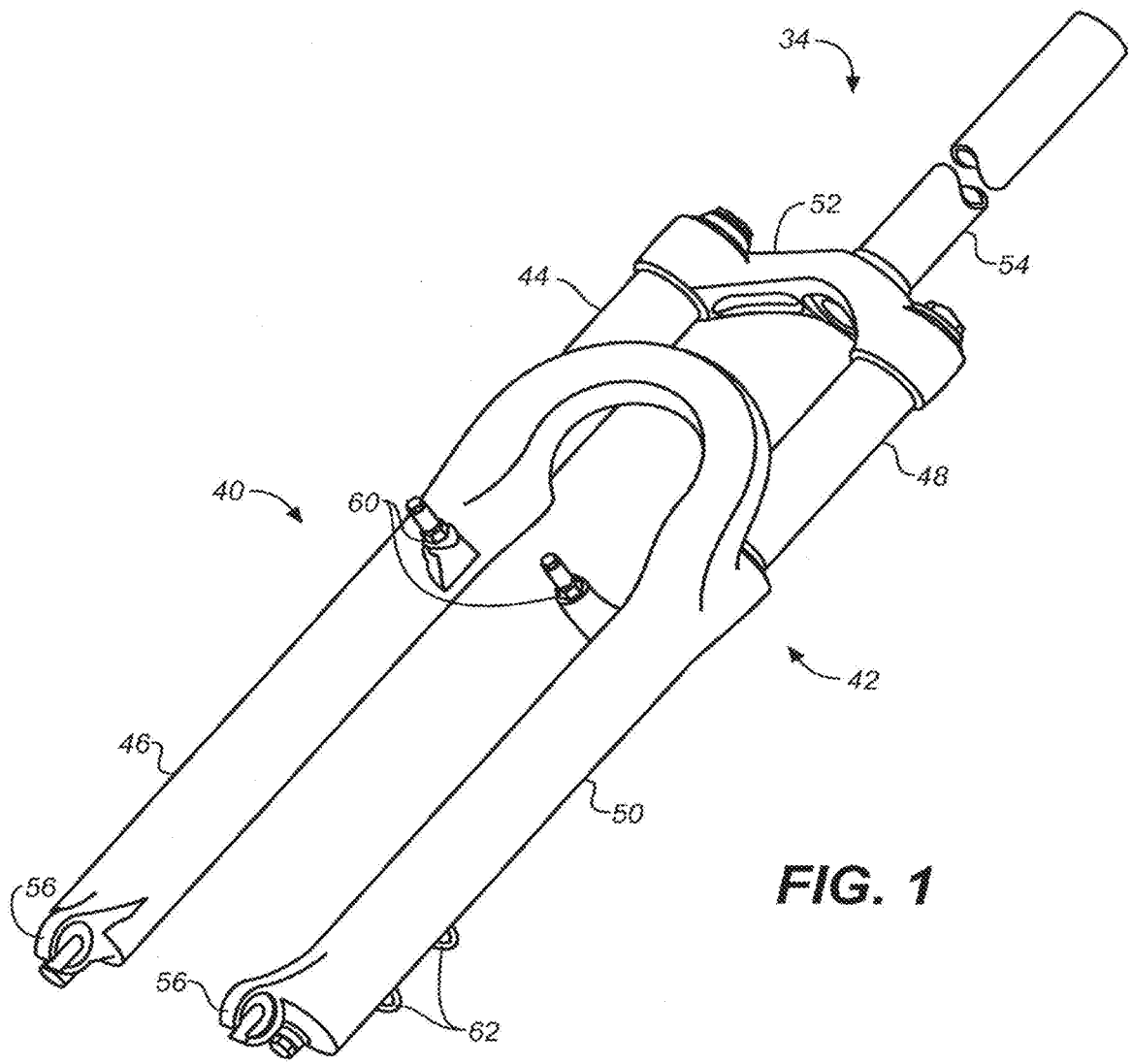
FIG. 1 is a schematic of a front suspension assembly in the form of a fork.

Vehicle wheel suspension often includes a damping mechanism for dissipating energy (e.g. from inertial wheel movement induced by disparities in the terrain over which the vehicle travels) and a spring mechanism for storing energy to rebound a compressed suspension to an uncompressed state. Damping assemblies often convert wheel movement into heat by means of fluid friction in a dashpot type device. Spring mechanisms may take many forms including, coiled springs, elastomer bumpers, compressible fluid (e.g. gas, silicone oil), suitable combinations thereof or other suitable energy storage mechanisms. Vehicles having a single front wheel, such as for example motorcycles and bicycles, often have front suspension assemblies in the form of a "fork" as shown in FIG. 1. The fork 34 shown in FIG. 1 includes lower leg tubes 46 and 50 having upper leg tubes 44 and 48 telescopically engaged respectively therewith. Crown 52 holds the telescopic fork legs in spaced relation to steering tube 54. Drop outs 56 accommodate the axle of a front bicycle wheel. The fork shown includes right leg 40 and left leg 42. The fork 34 shown in FIG. 1 is similar to suspension disclosed in U.S. Pat. No. 7,163,222 which patent is incorporated herein, in its entirety, by reference.

Figure 3:
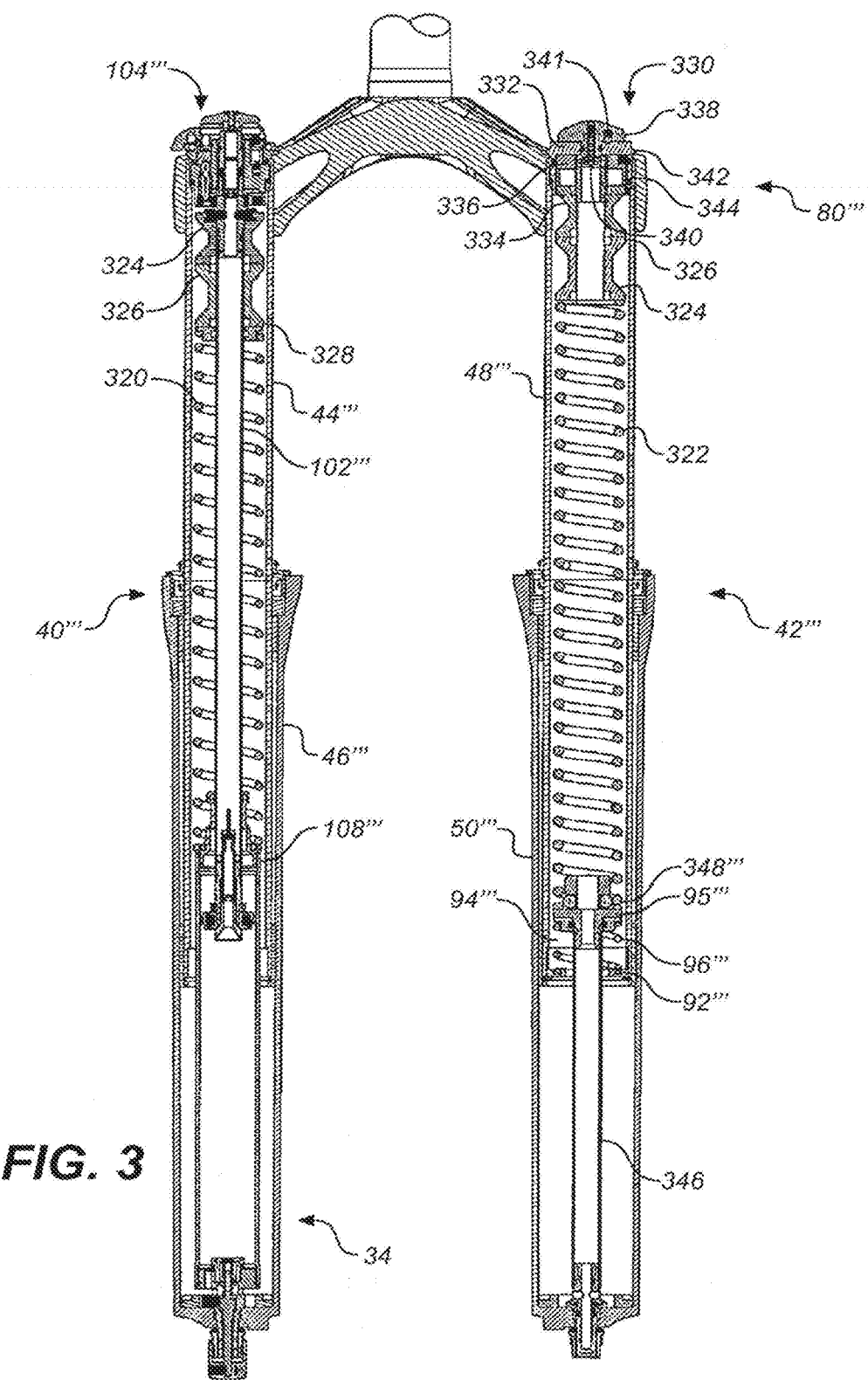
FIG. 3 is a cut away view of a coil-sprung embodiment of a suspension fork that may be adapted for use with the embodiments disclosed herein.
Figure 4:
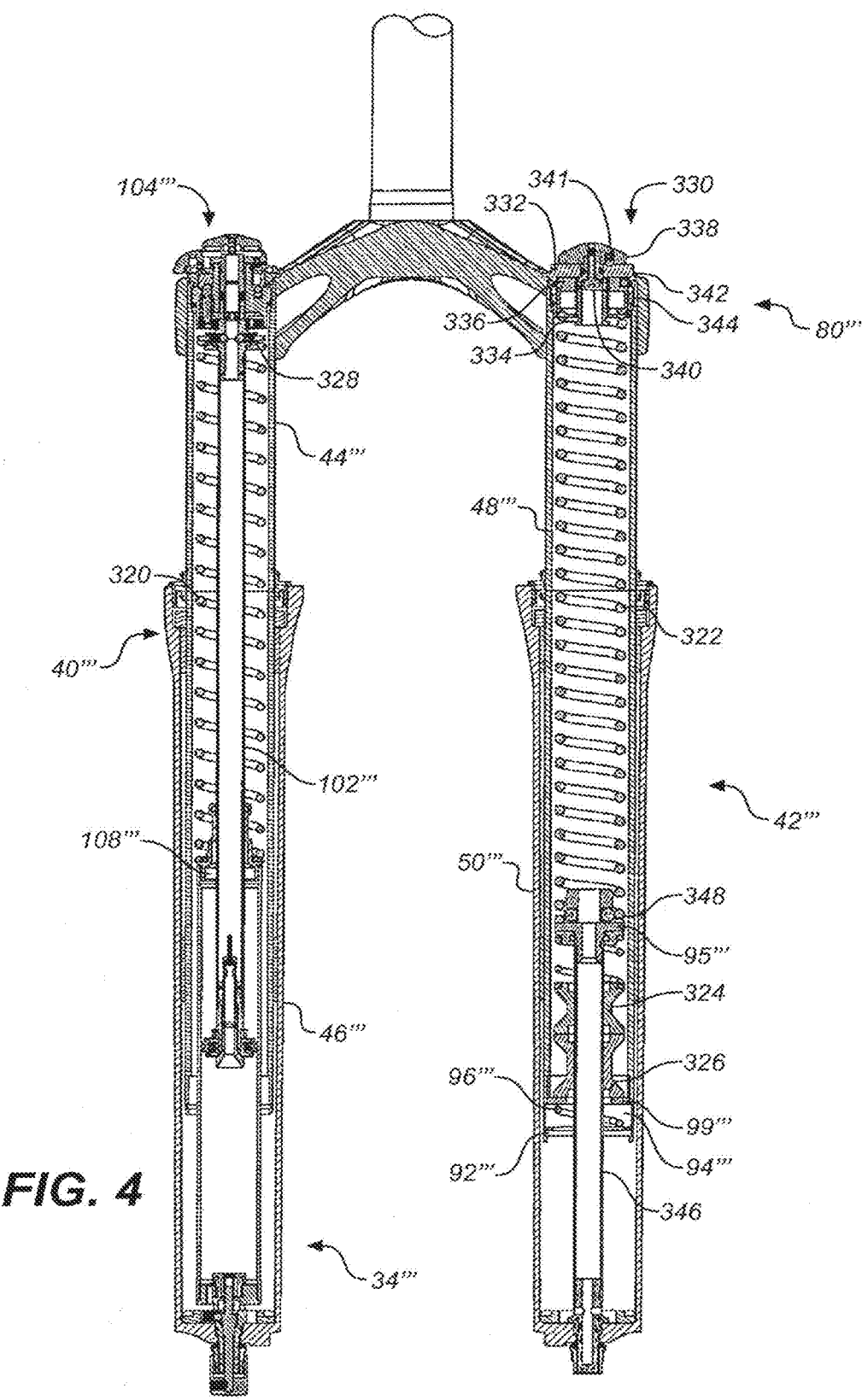
FIG. 4 is a cut away view of a bicycle fork that may be adapted for use with the embodiments disclosed herein.

FIG. 3 and FIG. 4 show embodiments of suspension that may be adapted for use with the systems and mechanisms described herein. FIGS. 3 and 4 illustrate a coil-sprung embodiment of the suspension fork, indicated generally by the reference character 34.

The coil-sprung fork embodiment 34 utilizes a pair of positive coil springs to provide an expansion force on the fork 34. A first spring 320 is located in the right fork leg 40, while a second spring 322 is located in the left leg 42. An air spring arrangement may be used in lieu of or in conjunction with a coiled spring. With a coil spring 320, 322 located in each of the fork legs 40, 42, respectively, the expansion force on the fork 34 is substantially balanced between the fork legs 40, 42. This enhances the coaxial telescopic motion of the upper legs 44, 48 relative to the lower legs 46, 50 during compression and rebound for smooth motion with reduced binding.

The first spring 320 is positioned in the right leg 40 between the damper cap assembly 104 and the cartridge tube cap 108. A pair of spacers, including a first spacer 324 and a second spacer 326, are interposed between the damper cap assembly 104 and the first spring 320. In one embodiment the spacers 324, 326 are substantially C-shaped so that they may be easily removed from the damper shaft 102 in a radial direction. Optionally, the spacers 324, 326 are configured to engage the damper shaft 102 in a snap fit arrangement.

A spring guide 328 is positioned between the first spring 320 and the spacer immediately adjacent the first spring 320 (spacer 326 in the illustrated embodiment) to assist in keeping the spring 320 concentric with the damper shaft 102. The cartridge tube cap 108 functions as a spring guide for the lower end of the first spring 320. However, a separate spring guide member may also be provided.

The second spring 322 is positioned in the left leg 42 between the spring cap assembly 80 and the upper spring stop 95. A first spacer 324 and a second spacer 326 are positioned between the spring cap assembly 80 and the spring 322. Desirably, the first and second spacers 324, 326 are substantially identical to the spacers described above in relation to the first spring 320.

A preload adjuster assembly 330 is provided to allow adjustment of the preload on the second spring 322. The preload adjuster assembly 330 generally comprises an adjuster cap 332, an adjuster shaft 334, a barrel 336 and an adjuster knob 338. The adjuster cap 332 is sealingly engaged with upper open end of the upper tube 48. The cap 332 includes a central aperture which allows the adjuster shaft 334 to pass through, preferably in a sealed arrangement. The adjuster knob 338 is fixed to the adjuster shaft 334 by fastener 340 such that rotation of the adjuster knob 338 results in rotation of the adjuster shaft 334. A ball detent assembly 341, substantially similar to those described above, may be provided between the adjuster cap 332 and the adjuster knob 338 to define a plurality of preload adjustment positions.

The barrel 336 is threadably engaged with the adjuster shaft 334 and engages the second spacer 326. In addition, the barrel 336 includes a ball pocket for holding a ball bearing 342, which rides within an axial groove 344 defined by the adjuster cap 332. This arrangement prevents the barrel 336 from rotating relative to the adjuster cap 332. Accordingly, rotation of the adjuster shaft 334, via the adjuster knob 338, results in translation of the barrel 336 relative to the adjuster cap 332. A change in the axial position of the barrel 336 alters the preload force on the spring 322.

The upper spring stop 95 is attached (e.g. roll-crimped) to a plunger rod 346 which extends upward from the closed end of the lower fork tube 50. The upper spring stop 95 includes an o-ring 348 which serves as a spring guide for the lower end of the spring 322. The o-ring 348 is preferred because it's compressibility allows a single size of o-ring to accommodate a number of different spring inner diameters. The inner diameter of a spring may vary with different spring rates, therefore, the o-ring 348 allows a number of springs 322 having varying spring rates to be used with the suspension fork 34. A negative spring chamber 94 is defined between the upper spring stop 95 and the lower spring stop 92. In one embodiment a single negative spring 96 is provided, rather than the dual negative coil spring arrangement of previous embodiments.

The fork assembly 34 of FIGS. 3 and 4 is capable of being adjusted for varying amounts of travel, or total distance between it's fully compressed and fully extended positions. With reference to FIG. 4, the fork 34 has been configured to have less travel than the fork 34 as configured in FIG. 3. To accomplish this, the spacers 324, 326 of the left leg 42 were moved from their position between the upper end of the spring 322 and the spring cap assembly 80 to a position below the plunger rod 346. Specifically, the upper spring guide 99 is slid downward on the plunger rod 346 and the spacers 324, 326 are positioned between the upper spring guide 99 and the upper spring stop 95. This lowers the upper tubes 44, 48 relative to the lower tubes 46, 50 and shortens the travel of the fork 34 by the combined length of the spacers 324, 326. In order to accommodate the shorter travel configuration without altering the preload on the first compression spring 320, the spacers 324, 326 (FIG. 3) are removed from the right fork leg 40.

In one embodiment the first spacer 324 is approximately 20 mm in length and the second spacer 326 is approximately 25 mm in length. The travel of the suspension fork 34 as configured in FIG. 3 is approximately 125 mm. As configured in FIG. 4, the travel is reduced to 80 mm. Optionally, only one of the spacers 324, 326 may be positioned below the upper spring stop 95 while the other spacer remains positioned above the spring 324. With this configuration, the fork travel would be shortened by the length of the spacer positioned below the upper spring stop 95, either 20 mm or 25 mm. The corresponding spacer 324, 326 may be removed from the right fork leg 40, to maintain the desired preload on the spring 320, as described above. Additionally, varying spacer configurations may be used. For example, the spacers 324, 326 may be replaced by a single spacer. Also, spacers of other lengths may be used.

U.S. Pat. No. 7,374,028 which patent is incorporated herein, in its entirety, by reference shows a shock absorber that may be adapted for use with the methods, systems and mechanisms described herein. For example referring to FIG. 12 of that patent, a portion of the fluid, displaced by shaft 120 during compression may be ported and conducted through the lower seal cap (by means of a flow path) surrounding shaft 120 and including shaft seals, to lubricate the shaft seals and then return to the primary reservoir.

Figure 2:
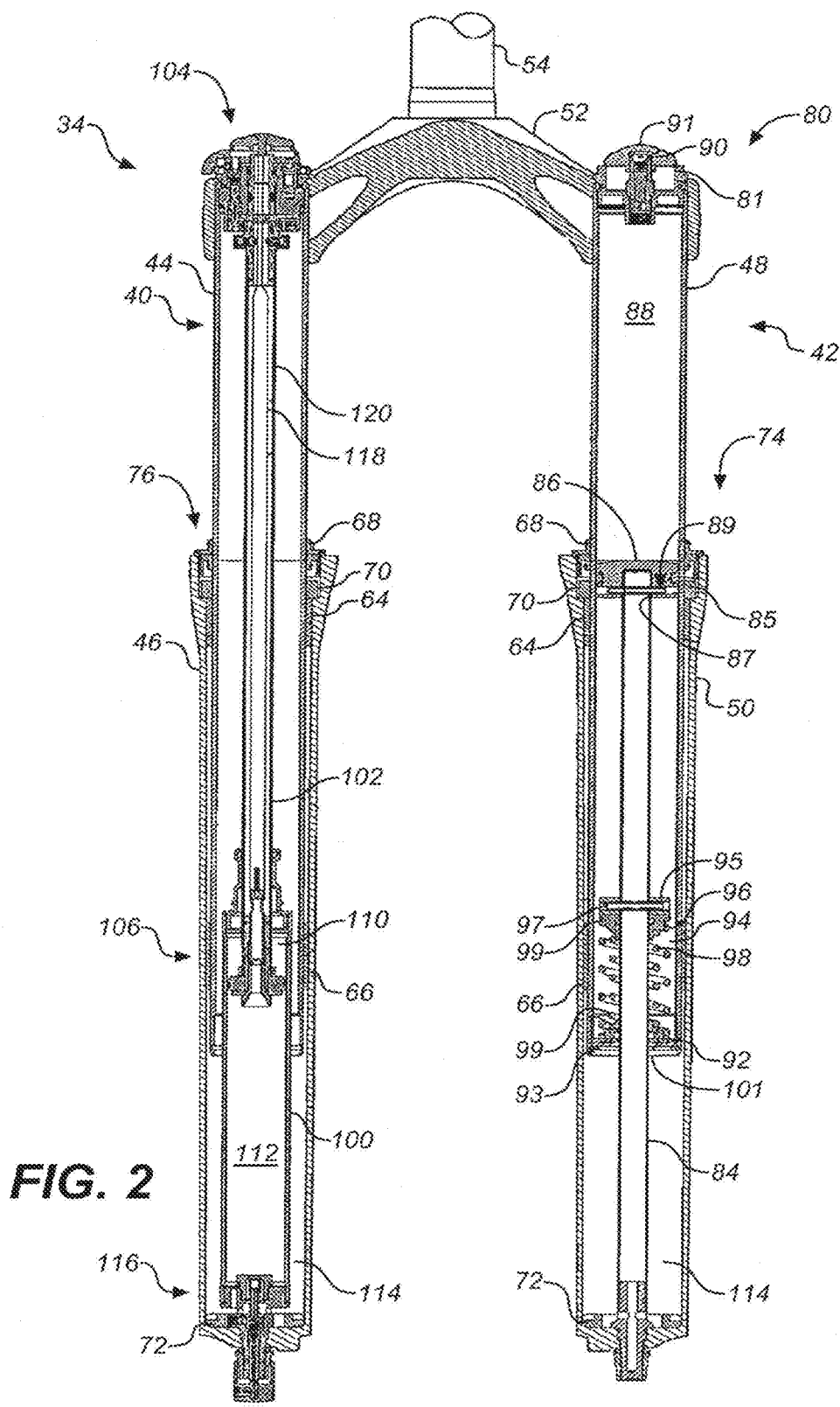
FIG. 2 is a cut away view of a bicycle fork embodiment as disclosed herein.
Figure 5:
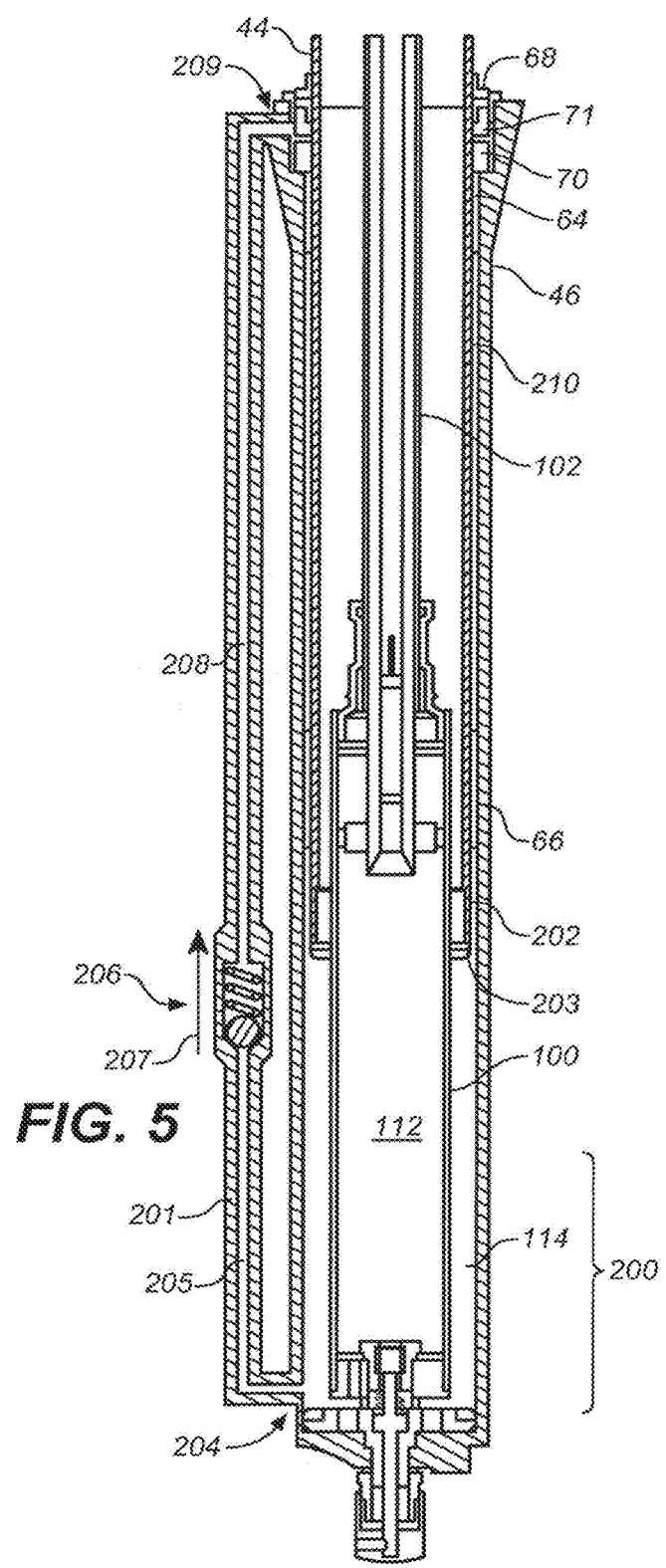
FIG. 5 is a cut away view of a bicycle leg embodiment as disclosed herein.

FIG. 2 and FIG. 5 show a cut away view of an embodiment of a bicycle fork (suspension fork 34) and leg respectively. The numbers shown and discussed herein in reference to FIG. 5 are, for the purposes of the description herein, applicable only to FIG. 5 herein so as not to be confused with their appearance elsewhere (although the same numbers may indicate similar corresponding elements elsewhere), for example in U.S. Pat. No. 7,163,222. Those same numbers may appear in U.S. Pat. No. 7,163,222 but such appearance is not subject to specific treatment herein (although those discussions and parts are incorporated by reference in their context along with U.S. Pat. No. 7,163,222). In relevant detail, as shown in FIG. 2, are lower leg tubes 46 and 50 having upper leg tubes 44 and 48 telescopically engaged respectively therewith. In the asymmetric fork embodiment of FIG. 2, leg 46/44 comprises a damping assembly while leg 48/50 comprises spring assembly. Optionally one leg may, or both legs may, comprise both a damping and spring assembly. In one embodiment, each fork leg includes a seal assembly 68/70, bushings 64 and 66 and a reservoir 114 containing a lubricating fluid (e.g. hydraulic damping oil). In one embodiment, the reservoir 114 tends to hold fluid toward a lower end 200 thereof due to the effects of gravity.

FIG. 2 shows other components of a suspension fork 34 that are not described in detail, but are depicted nonetheless for contextual purposes. These components are damper cap assembly 104, right leg 40 damper assembly 76, rebound damping assembly 106, compression chamber 112, upper compression passage 120, rebound rod 118, inner surface of the damper shaft 102, rebound chamber 110, steerer tube 54, crown 52, cap 91, valve 90, spring cap assembly 80, seal 81, positive air spring chamber 88, left leg 42, suspension spring assembly 74, spring piston 86, pin 89, radial through-hole 85, through-hole 87, pin 97, spring guides 99, snap ring 93, upper spring stop 95, outer negative spring 96, negative spring chamber 94, inner spring 98, spring plate 92, central aperture 101, spring piston rod 84 and bottom-out bumpers 72.

In one embodiment, each fork leg comprises a seal and wiper assembly, located at the entrance or upper opening of each lower leg tube 46 and 50, to seal fluid (e.g. oil) into the telescopic leg and/or to keep debris out of the telescopic leg. The seal assembly seals against an outer surface of the upper leg tube 44/48 as it moves telescopically relative to the opening. In the shown embodiment, the seal assembly comprises wiper seal 68 and foam ring 70.

Referring to FIG. 5 for detail of one embodiment, it is desirable that the wiper seal or main seal 68 be lubricated during use. Foam ring 70 retains hydraulic oil (e.g. damping fluid) in the region of ring 70 and distributes that onto upper leg tube 44, as upper leg tube 44 moves axially past the foam ring 70 and the wiper seal 68, so that wiper seal 68 can be lubricated. In one embodiment damping oil is supplied to the annular region of foam ring 70 and wiper seal 68 from reservoir 114 via fluid conduit 201.

The principles disclosed herein are equally applicable, by way of example, to either leg (or both legs) of a vehicle fork such as that shown in FIGS. 1, 2, 3, 4 and 5. For simplicity, an embodiment will be described by reference to the one fork leg of FIG. 5 (as shown, for example, from FIG. 2) which typifies in relevant respect the germane features of the embodiment. As the fork leg exemplified in FIG. 5 is used on, for example, a bicycle over terrain, the upper leg tube 44 telescopes in and out of the lower leg tube 46 in response to bumps or depressions that are encountered by a wheel attached to the drop out 56 (drop out 56 shown in FIG. 1) of the lower leg tube 46. During a compression stroke of the fork, caused by the wheel encountering a bump, the incursion of the upper leg tube 44, and particularly the lower portion 202 of the upper leg tube 44 into reservoir 114 tends to dynamically increase the pressure of the fluid in reservoir 114. Optionally such effect may be increased by adding an annular shaped substantially fluid tight end cap 203 inside or at the lower end of upper leg tube 44. Optionally end cap 203 may be a fluid flow restricting perforate fluid baffle. Optionally such end cap 203 may include check valves allowing fluid to flow downwardly out of an interior of upper leg tube 44 and into reservoir 114 but restricting flow upwardly into the interior of upper leg tube 44 (from reservoir 114). Miniature check valves (and other fluid flow elements) may comprise, for example, such valves as shown, or of a type shown, in the "Technical Hydraulic Handbook" copyright 1996 by The Lee Company. 2 Pettipaug Road, Westbrook, Conn. 06498 USA which handbook is incorporated herein, in its entirety, by reference. Additionally and as shown in FIG. 5, the damping piston rod 102 moves into compression chamber 112 during a compression stroke and forces fluid from compression chamber 112, through a valve or valves in the lower end of chamber 112, and into reservoir 114 thereby further increasing the fluid pressure in reservoir 114 and particularly a dynamic fluid pressure therein.

In one embodiment the increased fluid pressure in reservoir 114 causes hydraulic fluid (e.g. oil) in reservoir 114 to enter fluid conduit 201 at a lower end 204. It is noted that, because of the various annular flow restrictions (e.g. bushings 64, 66) between the lower end of the fork leg and the upper end, movement of upper leg tube 44 in and/or out of lower leg tube 46 does not create any appreciable dynamic fluid pressure change in the area of the seal assembly 68/70 including that in open annular area 71 between the wiper seal 68 and the foam ring 70 and the region of the foam ring 70. The increase in fluid pressure in reservoir 114 during a compression stroke therefore creates a differential pressure between the reservoir 114 and the annular area 71 and tends to push fluid from the reservoir 114 toward the open annular area 71 via fluid conduit 201 (because flow though conduit 201 is relatively unrestricted). With each compression stroke of the fork leg, some fluid is pushed into fluid conduit 201 at lower end 204 and moved upwardly past check valve 206. In one embodiment, as shown in FIG. 5, check valve 206 comprises a ball which is biased against a valve seat there below by a spring. In operation, the ball may be dislodged from the valve seat (against which the ball is spring biased—not numbered) by fluid pressure in flow path 205 of fluid conduit 201, thereby allowing fluid flow in direction of flow 207. In order to unseat the ball against the force of the spring, the fluid pressure in flow path 205 must be great enough that, when applied over the area circumscribed by the valve seat, it results in a force that is greater than the force exerted by the spring. Fluid in the upper section 208 of flow path of fluid conduit 201 is substantially blocked from flowing in a direction opposite the direction of flow 207 because such flow counter to direction 207 would serve to increase the force exerted by the ball on the valve seat and would therefore increase the closure force of check valve 206.

During a rebound stroke of the fork leg (in which upper leg tube 44 is axially moving relatively upward and out of lower leg tube 46 and lower portion 202 of upper leg tube 44 is correspondingly relieving pressure on reservoir 114) the check valve 206, having a "free flow" direction indicated by arrow 207 (and a flow check direction opposite of "free flow"), holds the fluid pushed into the upper section 208 of the fluid conduit 201 against backflow toward reservoir 114. The rebound stroke also creates a dynamic pressure in reservoir 114 that is somewhat lower than the pressure in area 71. That differential pressure causes damping fluid to be forced from the upper area 71, down though annulus 210 (past bushings 64, 66) and back to reservoir 114 (because back flow through conduit 201 is checked at valve 206.

As fluid (e.g. oil) fills upper (above the check valve 206) section 208, it ultimately flows into open annular space 71 through port 209 (point of entry of fluid). The fluid in the open annular space 71 encounters the wiper seal 68, an exterior of the upper leg tube 44, and the region of foam ring 70 and foam ring 70. The fluid thereby lubricates the wiper seal 68 and the exterior of upper leg tube 44 and replenishes the fluid saturation of foam ring 70. As foam ring 70 retains damping fluid within its region it becomes saturated and excess fluid flows down past bushing 64, through annular space 210, past bushing 66 and into reservoir 114. The fluid retained within the region of foam ring 70 remains available to lubricate the exterior of upper tube 44 as the fork cycles. The lubricating action is therefore relatively constant and not dependent on fluid surges that become available during fork compression strokes. In such a way, hydraulic fluid is circulated through the fork, to a retaining region and past the upper seal assembly by the pumping action of the fork during fork compression strokes.

Optionally, one or more of the bushings 64 and 66 (of which there may be more or less than two) may comprise cup or lip seals that allow fluid flow downwardly toward reservoir 114 but inhibit flow upwardly from reservoir 114 and through annular space 210. Cup seals, lip seals or chevron seals comprise a cross section that includes one or more relatively thin lips. Such a lip(s) typically seals fluid pressure by using that pressure to increase the force per unit area between the lip and a diametric surface adjacent thereto. The principle of such "chevron" or "lip" type seals is described in U.S. Pat. Nos. 4,787,642 and 5,246,236, each of which is incorporated, in its entirety, herein by reference. Note that in U.S. Pat. No. 5,246,236, seal 36 of FIG. 3 is described as metal. Such seal 36 may also comprise in whole or part an elastomer or other suitable highly elastic material. In one embodiment an annular flow barrier (e.g. washer shaped) having check valves there through may be fixed in annulus 210 where such check valves are configured to check flow from reservoir 114 to annulus 71 and to allow flow from annulus 71 to reservoir 114. Optionally, the fluid conduit 201 may be constructed by means of an annular space or partial annular space or channel(s) built around or within the wall of the lower leg tube 46. In one embodiment, the conduit or conduits (in parallel), and corresponding flow path 205, 208, may be cast into the wall of the lower leg tube 46. In such an embodiment a check valve containing ring barrier may be placed in the bottom of the reservoir 114 in sealing relation to an interior of the reservoir and configured such that fluid must pass through the ring (or plug) in order to enter the equivalent lower end 204 of the integral conduit(s). The one or more check valves in the ring are configured to allow fluid flow into the one or more equivalent flow paths 205,208 toward annulus 71 and to check fluid back flow toward reservoir 114 (i.e. they are analogous to valve 206 but may be placed at the entrance to the equivalent flow path 205, 208 rather than along the path). In another embodiment, an additional cylindrical portion (not shown) is included that surrounds all or a portion of the lower leg tube 46 and the flow path 205/upper section 208 of flow path comprises an annular fluid flow space between an interior of the cylindrical portion and an exterior of the lower leg tube 46. Optionally the check valve(s) may comprise an elastic sleeve covering an exterior of lower end port 204 (or other relevant port) such that fluid entering the flow path 205, 208 must stretch ("burp" valve) the sleeve to exit the reservoir 114 and is prevented from flowing back by the sleeve as it is recovered across lower end 204 following the exit of the fluid through that port. Such sleeve seals are shown as "expandable bands" 40 and 42 in U.S. Pat. No. 6,415,895 which is incorporated herein, in its entirety, by reference. Optionally the check valve may be at any location in the conduit, including immediately at the lower end 204. Optionally the fluid conduit 201 may include a plurality of check valves at different locations along the fluid flow path.

Optionally, the fluid conduit 201 may outlet back into the lower leg tube 46 at points other than port 209 (e.g. into a location or locations other than the open annular area 71). For example, the fluid conduit 201 may outlet directly into a side of the foam ring 70 and/or below the foam ring 70. Optionally, the fluid conduit 201 outlets at multiple points along the length of the lower leg tube 46. For example, the fluid conduit 201 may manifold into an interior of the lower leg tube 46 such that it outlets into open annular area 71, the side of the foam ring 70, below the foam ring 70, and into an outer surface of one or more bushings (e.g. 64, 66). In one embodiment one or more of such bushings may include a radial hole or holes (e.g. distributed circumferentially) through a wall thereof and an inner diameter of lower leg 46 may be enlarged in a region proximate such holes thereby creating a flow annulus around the bushing to distribute flow through the bushing holes. In one embodiment, the fluid flow path 208 is ported into the flow annulus region so that pressurized fluid may be delivered, via the bushing holes, to an inner diameter of the bushings during fork compression. Such an embodiment creates a bearing layer of damping fluid which lubricates the surface between the inner diameter of the bushing and the outer diameter of tube 44. The fluid conduit 201 may outlet at any point or points of desired lubrication or fluid introduction.

Optionally, bushings (e.g. bushings 64 and 66) may comprise linear motion bearings as shown in FIGS. 6A, 6B and 6C. In use, a suspension fork is typically positioned in a bicycle or motorcycle at a rake angle. More specifically, the steering tube (and hence the fork) is attached to the vehicle at an angle from the vertical (e.g. rake), as opposed to absolute vertical, to enable improved vehicle handling. An artifact of that angle is that the weight of the vehicle (and associated impulse load due to impact) bearing on the front wheel imparts not only compressive but also bending loads into the front fork and its legs. Such bending loads increase the relative sliding resistance between, for example, the upper leg tube 44 and the lower leg tube 46 (by increasing the normal/radial load on, for example a side of the bushing 64/66). An advantage of linear motion bearings is decreased apparent friction between upper leg tube 44 and lower leg tube 66 due to decreased friction between the upper leg tube 44 and the interior of the bushing. Such decreased friction allows the suspension to move more freely, and better absorb shock despite the tube side loading incident to the rake angle. Principles of linear bearings are described in U.S. Pat. Nos. 5,622,434; 6,619,844; and 4,952,075; each of which is incorporated, in its entirety, herein by reference. Optionally an inverted ("inside out") linear motion ball bearing bushing may be used and fixed to an exterior or the upper leg tube 44. In one embodiment a surface hardness treatment is applied to an exterior of the fork leg engaging such a ball type bearing to reduce the effect of high localized bearing stress on contacted portions of the fork leg. Surface treatments such a shot peening, nitriding, carburizing or ceramic coating or any suitable combination thereof or any other suitable surface treatment may be used.

In one embodiment, a ball bearing bushing as exemplified in FIGS. 6A, 6B and 6C includes circumferential fluid flow gaps and holes that are positioned circumferentially (e.g. within the gaps) around at least a portion of the ball bearing bushing. These fluid gaps receive fluid flowing from fluid conduit 201. The holes in turn receive the fluid through the fluid gaps from the outer portion of the ball bearing bushing and deliver the received fluid to the inner portion of the ball bearing bushing. In one embodiment, the fluid gaps receive this fluid from a fluid holding region that holds the fluid prior to distribution. Such a region may deliver fluid based on depletion, and corresponding lower pressure, within the gaps (e.g. siphon effect). In one embodiment, the fluid holding region circumferentially surrounds at least a portion of the ball bearing bushing, wherein that portion includes at last one of the fluid gaps. By the fluid gap sitting in, or adjacent, the fluid holding region, the fluid in the fluid holding region slowly leaks into the ball bearing bushing through the fluid gap. In another embodiment, a fluid channel runs from the fluid conduit 201 to the fluid holding region. The fluid channel delivers fluid from the fluid conduit 201 to the fluid holding region, during operation of the vehicle suspension.

In one embodiment, the mechanisms and methods described herein are adapted and configured to function during a rebound stroke of a suspension system. In such case for example, the optional cup seals (or lip seals) proximate bushings 64 and/or 66 may be directionally reversed such that they prevent flow from the open annular area 71 in a direction toward reservoir 114. In one embodiment, they (one or more) are fixed relative to upper leg tube 44 so that they move relative to the lower leg tube 46 during compression and extension. The seals may be fixed relative to the upper leg tube 44 in a region such that they do not interfere with the bushings (e.g. 64, 66) during compression or extension (i.e. rebound). A suitable location for such seal may be, for example, proximate lower portion 202 of upper leg tube 44. Mounted as such, the seals allow fluid to bypass, from below the seal to above the seal, during a compression stroke (upper leg tube 44 moving further into lower leg tube 46). During rebound, the seals retain the bypassed fluid and upward movement of the upper leg tube 44 relative to the lower leg tube 46, pulls the retained fluid upward in lower leg tube 46 and toward open annular area 71. In order to facilitate such upward movement past, for example, the bushings; the bushings (e.g. 64, 66) may be slotted axially, from end to end, in one or more locations along an inner (or outer) surface thereof. In one embodiment, such axial slots are fitted with miniature check valves such that fluid flowing from reservoir 114 to open annular area 71 may "free flow" in that direction while being checked or blocked in the reverse direction. Optionally or alternatively, the slotted or axially drilled (end to end along in a wall thereof) may be covered at an end closest to open annular area 71 (e.g. an upper end) by an annular elastic "burp" seal that allows flow toward open annular area 71 but recovers over the end of the bushing and precludes flow in the opposite direction. Such "burp" seals operate in a fashion similar (same in principle) to that described in relation to the elastic diameter covering bands discussed in reference to lower end 204 herein. In one embodiment, the free flow direction 207 is the reverse of that indicated in FIG. 5 and fluid flow is checked in the direction indicated by free flow direction 207. Fluid that is "pulled up" by the reversed seals fixed to the upper leg tube 44, as in the foregoing description flows from open annular area 71 (after depositing in foam ring 70 and wiper ring 68) into upper section 208 of flow path. From the upper section 208 of flow path, the fluid flows down through the direction of free flow 207 check valve, into flow path 205, through lower end 204 and back into reservoir (or chamber) 114. As described the cup seals will "swab" hydraulic fluid upwardly from reservoir 114 toward the upper seal assembly on every rebound stroke. Principles of fluid pumping by "swabbing" (including lip or cup type seals) are described in U.S. Pat. Nos. 4,070,134 and 4,528,896, each of which is incorporated, in its entirety, herein by reference. With the free flow 207 of check valve 206 reversed, fluid conduit 201 serves as the return flow path for excess fluid returning from the upper seal assembly to the reservoir 114 (or chamber).

While the foregoing is directed to embodiments of the present invention, other and further embodiments of the invention may be implemented without departing from the scope of the invention, and the scope thereof is determined by the claims that follow.

What is claimed is:

1. A self-lubricating suspension comprising:
   an upper leg tube;
   a lower leg tube, said lower leg tube having an opening therein for telescopically receiving said upper leg tube, said upper leg tube and said lower leg tube telescopically moveable with respect to each other during operation of said self-lubricating suspension;
   a seal assembly coupled to said lower leg tube proximate said opening, said seal assembly configured to seal against an outer surface of said upper leg tube as said upper leg tube moves telescopically with respect to said lower leg tube, said seal assembly further comprising a linear motion ball bearing bushing;
   a fluid reservoir disposed at least partially between an inner surface of said lower leg tube and an outer surface of said upper leg tube, said fluid reservoir having a pressure therein, wherein said pressure is dynamically affected as said upper leg tube moves telescopically with respect to said lower leg tube;
   a fluid conduit, said fluid conduit in fluid communication with said fluid reservoir and said seal assembly, said fluid conduit defining a flow path extending between said seal assembly and said fluid reservoir, wherein said pressure, which is dynamically affected as said upper leg tube moves telescopically with respect to said lower leg tube, causes fluid to flow from said fluid reservoir into said fluid conduit, to said seal assembly, and then back into said fluid reservoir such that as said upper leg tube moves telescopically with respect to said lower leg tube said fluid flows through said fluid conduit and to said seal assembly to repeatedly provide said fluid to said seal assembly for generating lubrication between said upper leg tube and said lower leg tube and such that said self-lubricating suspension generates said lubrication as said upper leg tube moves telescopically with respect to said lower leg tube; and
   an annular space extending from said seal assembly to said fluid reservoir.

2. The self-lubricating suspension of claim 1 wherein said linear motion ball bearing bushing further comprises an inverted linear motion ball bearing bushing.

3. The self-lubricating suspension of claim 2 wherein said inverted linear motion ball bearing bushing is fixed to an exterior of said upper leg tube.

4. The self-lubricating suspension of claim 3 wherein said upper leg tube has a surface hardness treatment applied to an exterior of said upper leg tube.

5. The self-lubricating suspension of claim 4 wherein said surface hardness treatment is selected from the group consisting of: shot peening, nitriding, carburizing and ceramic coating.

6. The self-lubricating suspension of claim 1 wherein said linear ball bearing bushing includes circumferential fluid flow gaps which are positioned circumferentially around at least a portion of said linear ball bearing bushing.

7. The self-lubricating suspension of claim 6 wherein said fluid flow gaps receive fluid flowing from said fluid conduit, said fluid flow gaps delivering said fluid to an inner portion of said linear ball bearing bushing.

8. The self-lubricating suspension of claim 6 wherein said fluid flow gaps of said linear ball bearing bushing comprise a fluid holding region.

9. The self-lubricating suspension of claim 8 wherein said fluid holding region delivers fluid therefrom based on depletion and a corresponding siphon effect.

10. The self-lubricating suspension of claim 8 wherein said fluid holding region circumferentially surrounds at least a portion of said linear ball bearing bushing and said fluid in said fluid holding region leaks into said linear ball bearing bushing through said fluid flow gaps.

11. The self-lubricating suspension of claim 8 further comprising a fluid channel fluidically coupling said fluid conduit and said fluid holding region.

12. The self-lubricating suspension of claim 11 wherein said fluid channel delivers said fluid from said fluid conduit to said fluid holding region during operation of said self-lubricating suspension.

\* \* \* \* \*